United States Patent [19]

Andersen

[11] Patent Number: 5,121,970
[45] Date of Patent: Jun. 16, 1992

[54] WHEEL BARROW DUMP APPARATUS

[76] Inventor: Charles J. Andersen, 3158 Ames, Omaha, Nebr. 68104

[21] Appl. No.: 637,550

[22] Filed: Jan. 4, 1991

[51] Int. Cl.$^5$ .......................... B62B 1/24; B62B 1/20
[52] U.S. Cl. .................................. 298/3; 280/47.31; 280/47.315
[58] Field of Search ............... 298/2, 3; 414/338, 490; 280/47.31, 47.3, 47.315, 47.36, 47.37 R, 47.371, 653

[56] References Cited

U.S. PATENT DOCUMENTS

| 469,265 | 2/1892 | Otto | 298/3 |
|---|---|---|---|
| 855,309 | 5/1907 | Heineman | 298/3 |
| 1,032,009 | 7/1912 | Long | 298/3 |
| 1,261,532 | 4/1918 | Hoe | 298/3 |
| 2,037,222 | 4/1936 | Farrar | 280/47.31 |
| 2,744,763 | 5/1956 | Carter | 280/47.31 |
| 2,973,224 | 2/1961 | Wall | 298/3 |

FOREIGN PATENT DOCUMENTS

| 756467 | 4/1967 | Canada | 280/47.31 |
|---|---|---|---|
| 454733 | 3/1927 | Fed. Rep. of Germany | 208/47.31 |
| 442611 | 4/1912 | France | 298/3 |
| 2566356 | 12/1985 | France | 280/47.31 |
| 13708 | of 1888 | United Kingdom | 298/3 |

Primary Examiner—Frank E. Werner
Assistant Examiner—Brian K. Dinicola
Attorney, Agent, or Firm—John A. Beehner

[57] ABSTRACT

A wheel barrow dump apparatus adapted to be installed on a conventional wheel barrow type device utilizing a hinged mounting for the bucket. The apparatus includes at least one catch arm and associated cross member, attached to the rear of the bucket. The catch arm limiting the pivoting travel of the bucket on the hinged mounting to the length of the catch arm.

The invention also provides a method of dumping refuse collected in the wheel barrow bucket including: filling the bucket; transporting the wheel barrow to the dumping point; raising the wheel barrow handle; allowing the bucket to pivot on its hinged mounting until the cross members engage to the standard frame; allowing the refuse to spill from the bucket; lowering the wheel barrow handles causing the catch arms to lower the bucket until it settles on the standard frame.

10 Claims, 6 Drawing Sheets

WHEEL BARROW DUMP APPARATUS

BACKGROUND OF THE INVENTION

The present invention is directed generally to an improvement in wheel barrow type devices and more particularly to a method and apparatus to facilitate the dumping of refuse collected in the bucket of a wheel barrow.

Wheel barrows are well known in the art and their uses are varied but primarily being for the transportation of refuse from one place to another. Also known in the art are hinged mountings attached between the bucket and the standard wheel barrow frame, allowing the bucket to be pivoted independently of the standard frame. This facilitates the dumping of the refuse from the bucket since the operator need not get as close to the wheel barrow's center of gravity to release the contents from the bucket.

A major disadvantage of using the currently available hinged mounting for the bucket is the inability to stop the bucket from pivoting once it starts. The result being, the bucket flips causing the handles to accelerate forward in the operator's hands. This is especially troublesome and potentially hazardous to the operator, if the refuse is being dumped off a building or the like, under construction, where the operator is some distance off the ground. Accordingly, it is a primary objective of the present invention to increase operator safety by providing a means for limiting the amount of travel in the bucket when attached to a hinged mounting.

Another disadvantage of the currently available hinged mounting is the requirement for the operator to manually grasp the lip of the bucket and pull it back onto the frame once the refuse has been emptied therefrom. This is especially difficult if, as a result of the dumping of the refuse, the bucket is upside down on the ground and almost impossible if the refuse is being dumped over the edge of a building or the like. Accordingly, it is an additional objective of the present invention to provide a means for retracting the bucket on the hinged member and returning it to its original position on the standard frame without having to manually grasp the bucket.

Another objective of the present invention is to provide a wheel barrow dump apparatus which is of rugged construction, inexpensive to build and easy to install and use.

SUMMARY OF THE INVENTION

The present invention teaches both a novel wheel barrow dump apparatus and a novel method of dumping refuse collected in the wheel barrow bucket. The wheel barrow dump apparatus is adapted to be installed on a conventional wheel barrow. The apparatus includes a hinged mounting interposed between the wheel barrow bucket and the standard frame such that the bucket may be pivoted upward and substantially forward over the wheel barrow wheel, at least one catch arm to be attached to the rear of the bucket, and at least one cross member to be attached to the catch arm and operative to arrest the travel of the bucket by engaging the standard frame handle.

The method of dumping refuse collected in the wheel barrow bucket includes the steps of: (1) providing an improved wheel barrow apparatus including a hinge mounted bucket with catch arms; (2) filling the bucket with the refuse; (3) transporting the wheel barrow to the dumping point; (4) raising the wheel barrow handle causing the barrow to pivot around the wheel and allowing the bucket to pivot on its hinged mounting to the limit of the catch arm(s); (5) allowing the refuse to spill out; (6) lowering the wheel barrow handle causing the catch arm(s) to lower the bucket and finally settle on the standard frame.

DESCRIPTION OF THE PREFERRED EMBODIMENTS

The apparatus of the present invention is best illustrated in FIGS. 1 through 4. The method of the present invention is best seen in FIG. 5.

Figure 1:
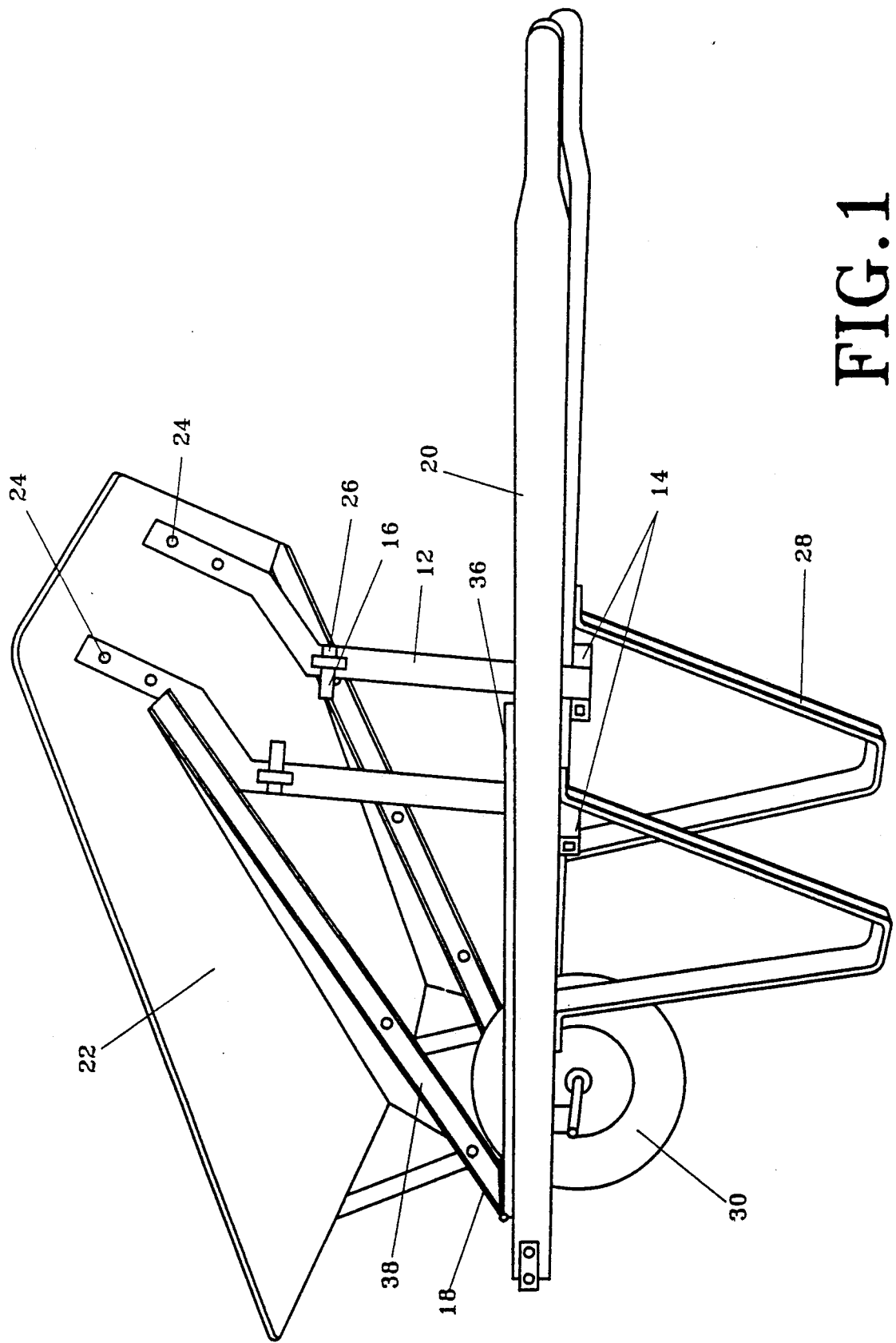
FIG. 1 shows a rear quarter view of the wheel barrow dump apparatus in the extended or dump position. The view shows all major components of the apparatus including the catch arms, cross members, hinged mounting and safety catches.
Figure 2:
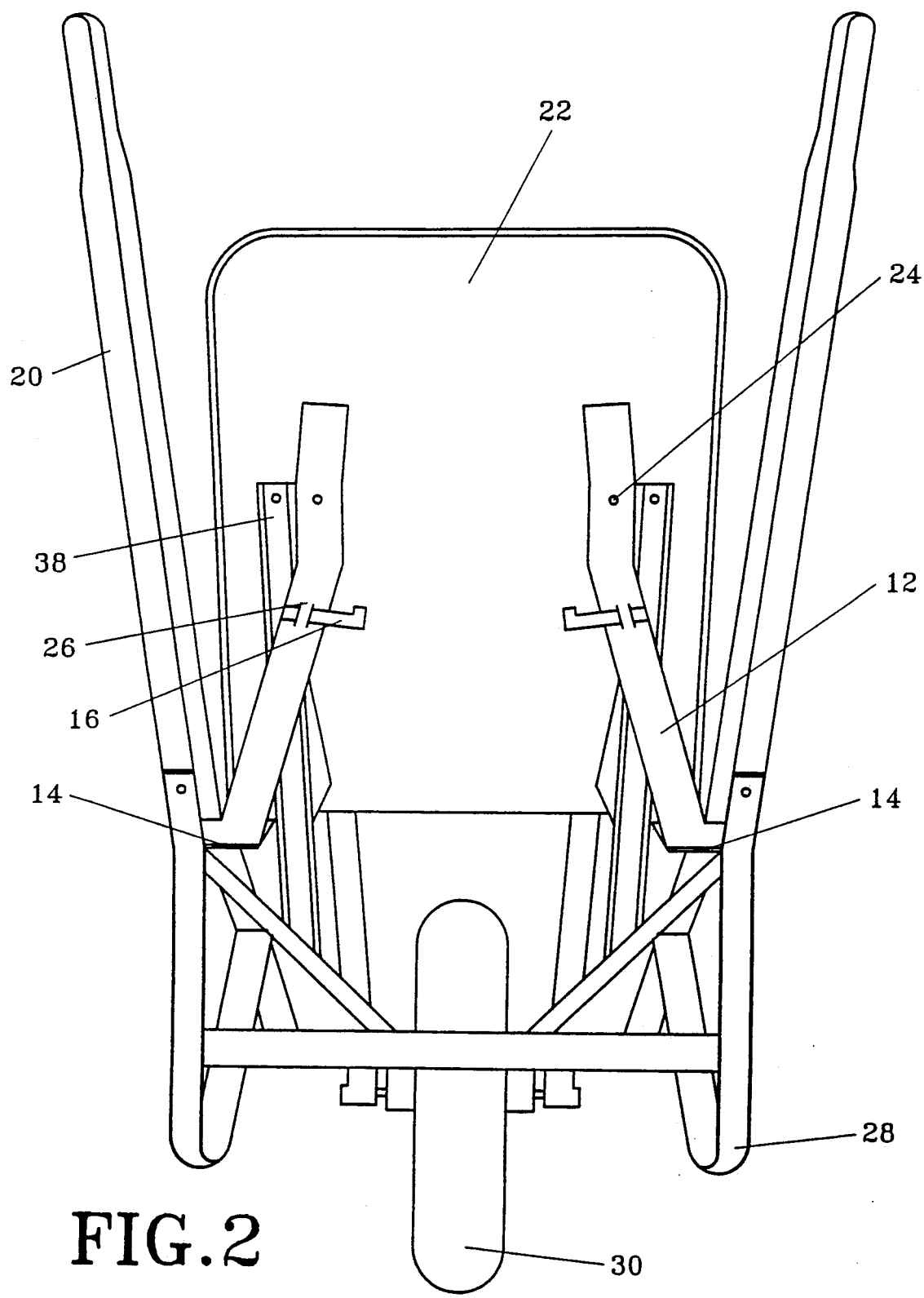
FIG. 2 shows a rear view of the apparatus in the dump position.

It can be seen from FIG. 1 that the bucket 22 of the standard wheel barrow has been separated from the standard frame 20 and that a hinged mounting 18 has been placed between the bucket 22 and the standard frame 20. The bucket 22 is attached to the upper arm 38 of the hinged mounting 18 and the standard frame 20 is attached to the lower arm 36. The attachment of the bucket 22 to the upper arm 38 of the hinged mount 18 is accomplished using conventional bolts 34 shown in FIG. 4. Similarly, the attachment of the lower arm 36 of the hinged mount 18 to the standard frame handles 20 is accomplished using conventional bolts 32 also shown in FIG. 4. The mounting of the bucket 22 on the hinged mount 18 allows the bucket 22 to be pivoted upward and away from the standard frame 20 as shown in the figure. Also shown in FIG. 1 are the catch arms 12 mounted to the rear of bucket 22 by means of conventional attachment bolts 24. The catch arms 12 are attached to the bucket 22 such that they run generally downward and adjacent the inside surface of the standard frame handles 20 shown clearly in FIG. 2. In the preferred embodiment the catch arms 12 are constructed of steel, but could be constructed of any rigid and strong material. Also shown in FIG. 1 are the cross members 14 attached to the opposite ends of the catch arms 12 as shown in FIGS. 1 and 2. When the bucket is in the dump or extended position, the cross members 14 will engage the underside of the standard frame handles 20 thereby stopping the movement of the bucket 22, shown in FIGS. 1, 2 and 3. Also shown are safety catches 16 attached to the catch arms 12, FIGS. 1 and 2. The safety catches 16 are attached to the catch arms 12 by means of a slit 26 cut into the catch arms 12. The safety catches 16 are frictionally mounted through the slit 26 in the catch arms 12 and are mounted a sufficiently spaced relation below the bucket 22 such that when the bucket 22 is in the down or travel position, the safety catches 16 are on the side of the standard frame handles 20 opposite the bucket 22, FIG. 4. This positioning of the safety catches 16 allows the bucket 22 to be latched in the down position by sliding the catches 16 outward, thereby engaging the underside of the standard frame handles 20 and preventing any pivoting of the bucket from the frame 20. Although two catch arms 12 and associated cross members 14 are shown, it is also within the scope of this disclosure that a single catch arm and associated cross member could be used to engage the standard frame. Similarly, the catch arms 12 could be attached to the bucket 22 such that the arms 12 were adjacent the outside surface of the standard frame handles 20.

FIG. 2 shows the apparatus in the dumping position and in particular of the placement of the catch arms 12 in relation to the standard frame handles 20. It is to be noted that in the preferred embodiment, the catch arms 12 are positioned adjacent the inside surface of the standard frame handles 20. Also to be noted is how the cross members 14 are attached to the catch arms 12 to extend outward from the arms 12 and underneath the standard frame handles 20 such that when the bucket 22 is pivoted upward, the cross members will contact the handles 20.

Figure 3:
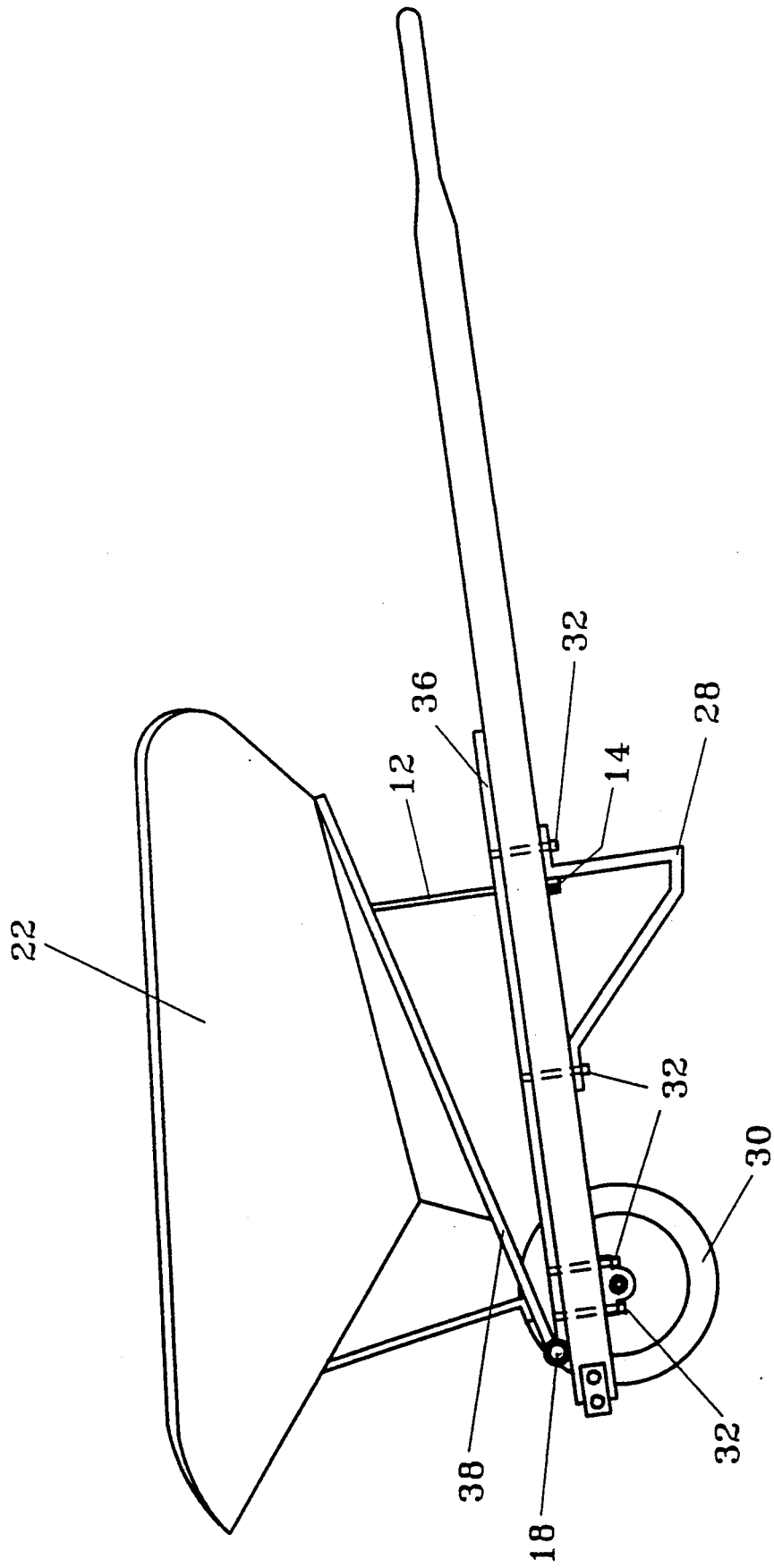
FIG. 3 is a side view of the apparatus in the dump position.

FIG. 3 is a side view of the apparatus 10 showing the bucket 22 in the extended or dump position. As is seen in the figure, the bucket 22 is in the full travel position and the cross members 14 attached to the end of the catch arms 12, have engaged the underside of the standard frame handles 20 and have arrested travel of the bucket 22. Also shown are the conventional attachment bolts 32 for securing the lower arms 36 of the hinged mounting 18 to the standard frame 20.

Figure 4:
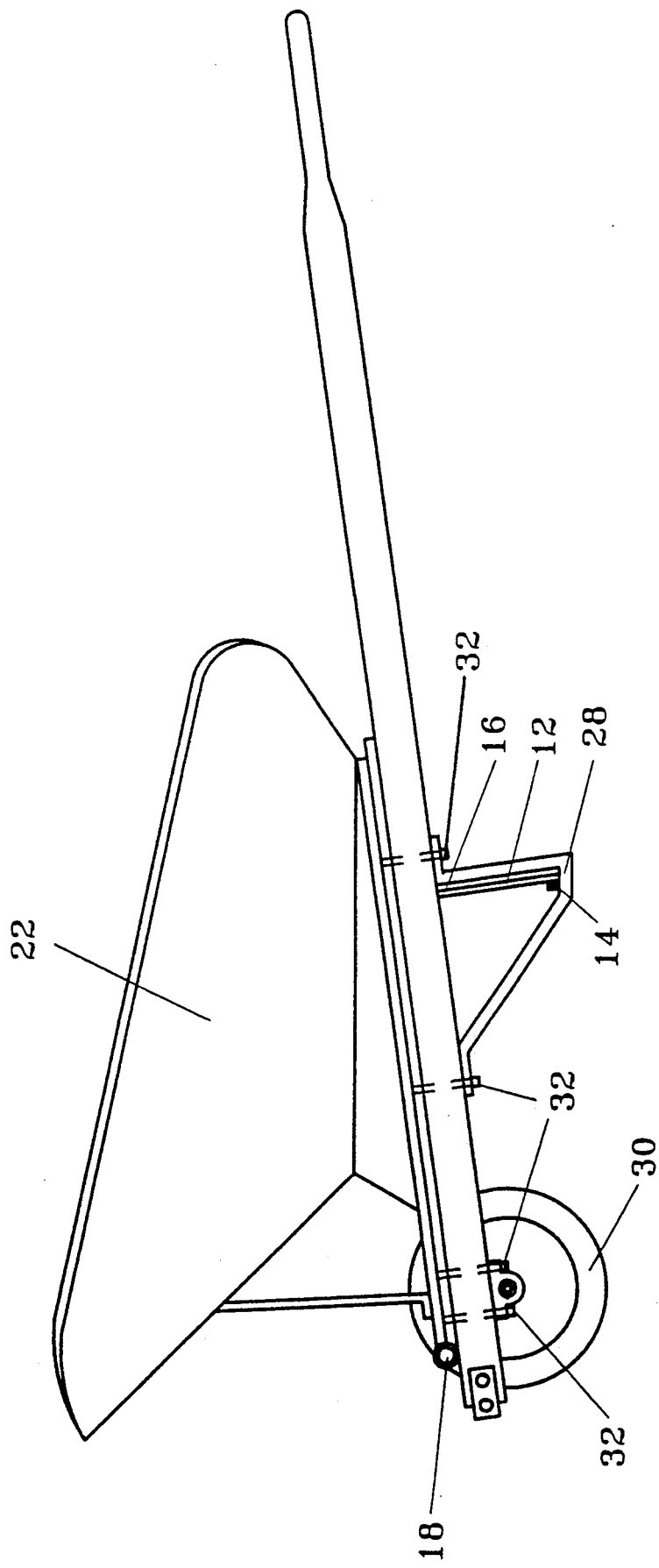
FIG. 4 is a side view of the apparatus in the lowered or travel position.
Figure 5:
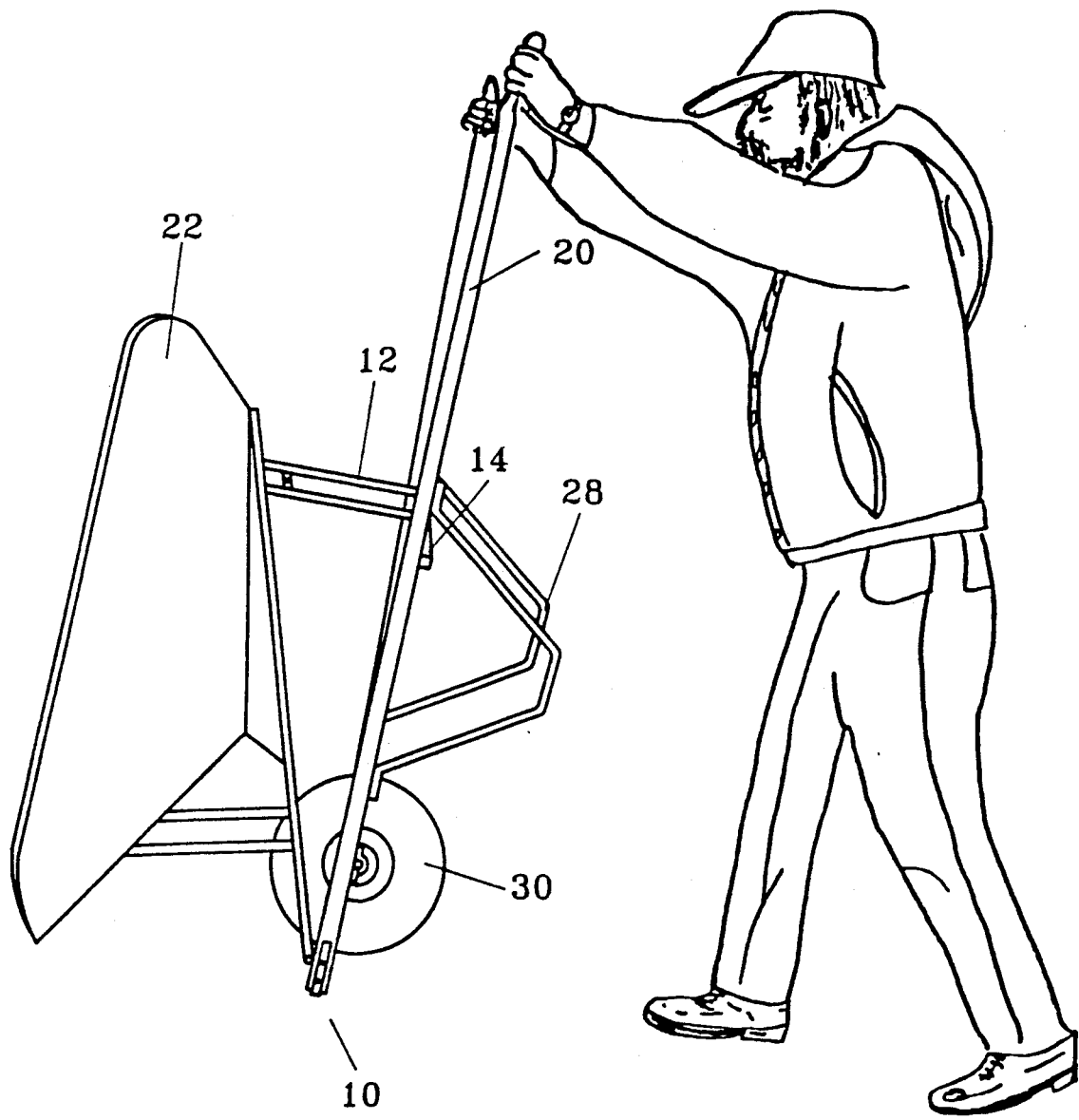
FIG. 5 is a side view of the apparatus in the dump position and illustrating the greater distance from the wheel barrow which can be maintained when operating the apparatus.

FIG. 4 shows the bucket 22 in the down or travel position. The upper arm 38 of hinged mounting 18 is resting atop the lower arm 36 of the hinged mounting 18. It will also be noted that the cross members 14 are no longer in contact with the underside of the standard frame handles 20 and that the safety catches 16 are situated on the side of the standard frame handles 20 opposite the bucket 22. Also shown in the figure are the bucket attachment bolts 34 used to secure the upper arm 38 of the hinged mounting 18 to the bucket 22.

Figure 6:
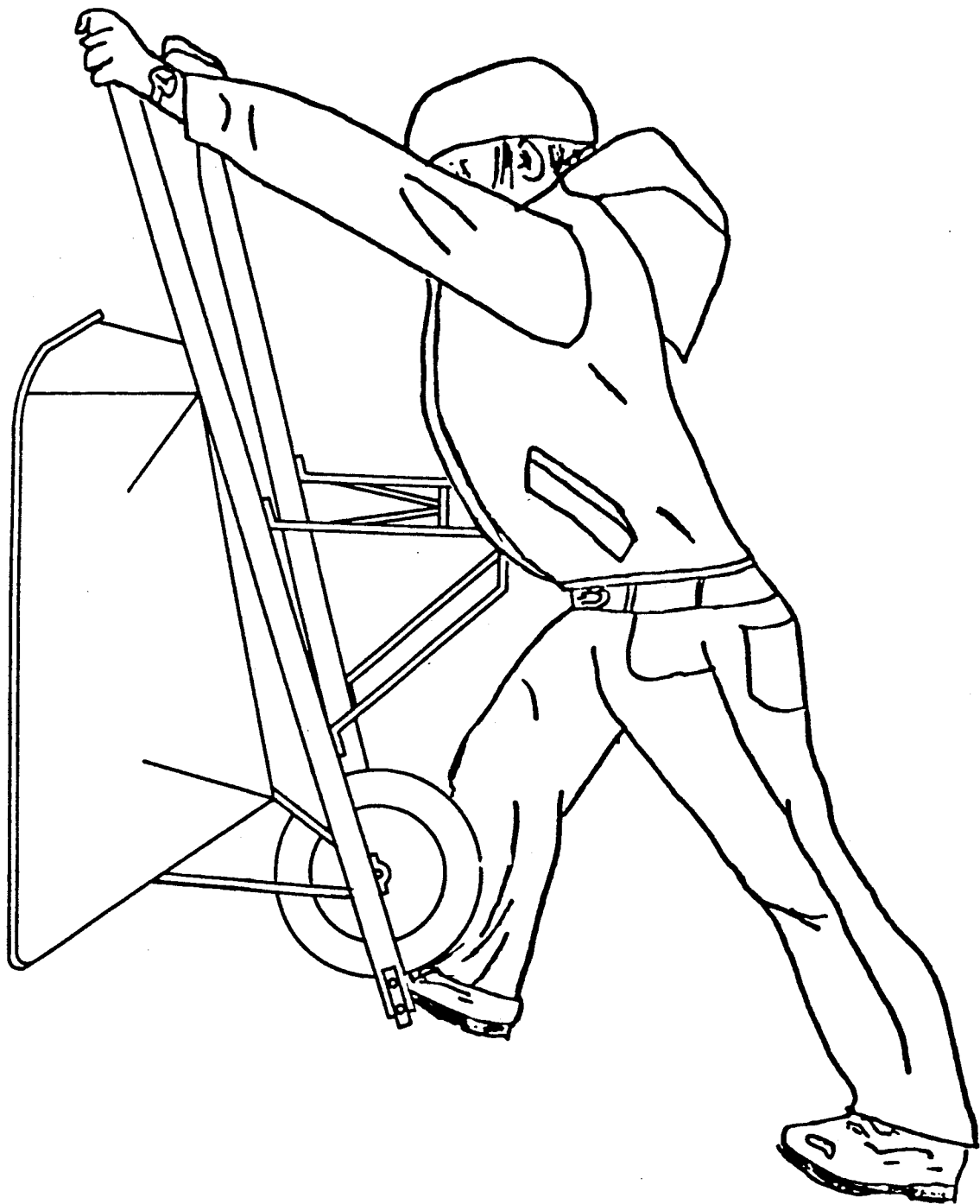
FIG. 6 is a side view of a conventional wheel barrow and illustrates the necessity of the operator maintaining a close proximity to the wheel barrow when it is being dumped.

FIGS. 5 and 6 show and contrast the improved method and apparatus 10 of the present invention (FIG. 5) and the prior art wheel barrows (FIG. 6). It is apparent when comparing the two FIGS., that the operator is able to dump the contents of the improved wheel barrow while maintaining a greater distance from the apparatus 10 (FIG. 5). With presently available wheel barrows (FIG. 6), the operator must position himself and consequently his center of gravity substantially over the wheel barrow to dump the contents therein.

Whereas the invention has been shown and described in connection with a preferred embodiment thereof, it is apparent that many modifications, additions and substitutions may be made which are within the intended broad scope of the appended claims. For example, the number and placement of catch arms and the construction material thereof may be varied to suit any conceivable application.

Thus there has been shown and described a wheel barrow dump apparatus which accomplishes at least all of the stated objectives.

I claim:

1. An improved wheel barrow type apparatus for facilitating the dumping of refuse collected in a wheel barrow having a standard frame having a pair of generally straight, forwardly converging and connected frame members, a rotatably mounted wheel mounted forwardly on said frame members and spaced rearwardly from the front end of said standard frame and a bucket mounted on said frame members, said improvement comprising:

a hinged mounting having two pivotable arms and a hinged mounting pivot axis therebetween, said hinged mounting interposed between said bucket and said standard frame such that one of said arms is mounted on said frame, the other of said arms is mounted to said bucket and said hinged mounting pivot axis is above and forward of the rotational axis of said wheel and generally parallel with said rotational axis of said wheel, said rotational axis substantially perpendicular to the longitudinal axis of said frame whereby said bucket may be pivoted about said hinged mounting pivot axis and thereby be tilted upwardly and forwardly for facilitating removal of refuse therein, catch arm means rigidly connected to said bucket and depending downwards therefrom such that the lower end of said catch arm means is below said frame members, and a first cross member supported on said catch arm means at a position in spaced relation below said bucket and extended transversely outwardly below at least one of said frame members of said standard frame such that upon said bucket being forwardly pivoted, said cross member is pivoted outwardly until contacting at least one of said frame members, thereby limiting pivoting motion of said bucket.

2. The invention of claim 1 wherein said hinged mounting is fastened to the standard frame such that said pivot point of said hinged mounting is substantially over said wheel barrow wheel.

3. The invention of claim 1 wherein said catch arm means is mounted on said bucket such that said catch arm means is located between said frame members of said standard frame.

4. The invention of claim 1 wherein said catch arm means further comprises a pair of catch arms rigidly connected to said bucket and depending downwards therefrom in spaced apart relation.

5. The invention of claim 4 wherein said catch arms are attached to said wheel barrow bucket such that each of said catch arms is adjacent to opposite frame members of said wheel barrow.

6. The invention of claim 5 wherein said arms are made of steel.

7. The invention of claim 4 further comprising a second cross member.

8. The invention of claim 7 wherein said first cross member is supported on one of said catch arms, said second cross member being supported on the other of said catch arms, said first and second cross members being supported at positions in spaced relation below said bucket and each of said cross members extended transversely outwardly below one of said frame members, said first cross member below one of said frame members, said second cross member below the other of said frame members, such that upon said bucket being forwardly pivoted, said first and second cross members are pivoted upwardly into contact with the respective frame members, thereby limiting pivoting motion of said bucket.

9. A kit for modifying a standard wheel barrow type apparatus to facilitate the dumping of refuse collected in a wheel barrow having a standard frame having a pair of generally straight forwardly converging and connected frame members, a rotatably mounted wheel mounted forwardly on said frame members and spaced rearwardly from the front end of said standard frame and a bucket mounted on said frame members, said kit comprising:

- a hinged mounting having two pivotable arms and a hinged mounted pivot axis therebetween,
- catch arm adapted to be rigidly connected to a bucket of a wheel barrow and to depend downwards therefrom for pivotal movement therewith, at least one of said pivoting arms of length equal to or greater than the length of said catch arm means,
- a first cross member supported on said catch arm means towards said lower end of said catch arm means, and extended transversely from said catch arm means, and
- said hinged mounting adapted to be interposed between and mounted to a bucket and a standard frame of a wheel barrow, said catch arm means adapted to be rigidly connected to a bucket of a wheel barrow and depend downwards therefrom, said hinged mounting and said catch arm means mounted such that when said bucket is provided, said catch arm means is pivoted upwards, thereby bringing said first cross member into contact with a frame member, thus limiting pivoting motion of said bucket.

10. The invention of claim 9 wherein said catch arm is mounted on a wheel barrow bucket such that said catch arm is located between frame members of a wheel barrow.

* * * * *